United States Patent [19]

Graves

[11] Patent Number: 4,479,037
[45] Date of Patent: Oct. 23, 1984

[54] TROLLEY BRIDGE

[75] Inventor: William L. Graves, Leadville, Colo.

[73] Assignee: AMAX Inc., Greenwich, Conn.

[21] Appl. No.: 447,614

[22] Filed: Dec. 7, 1982

[51] Int. Cl.³ ............................................. B60M 1/20
[52] U.S. Cl. ..................................................... 191/36
[58] Field of Search .................. 191/1 R, 8, 9, 14, 20, 191/21, 22 R, 23 A, 28, 36, 39

[56] References Cited

U.S. PATENT DOCUMENTS

| 450,687 | 4/1891 | Thomson | 191/36 |
| 779,554 | 1/1905 | McCarroll | 191/36 |
| 820,090 | 5/1906 | Bowman | 191/36 |

Primary Examiner—Richard A. Schacher
Attorney, Agent, or Firm—Roland T. Bryan

[57] ABSTRACT

A trolley conductor bridging means in an electrically powered trolley vehicle transportation system where said trolleys run by contact with a solid conductor and where said conductors are interrupted to provide a door clearance opening is disclosed wherein said means when closed provides for continuous electrical power and mechanical indistinguishable connection across said interruption and wherein said means is opened and closed automatically by the downward and upward force of the transverse moving door. The downward and upward force of said door is translated to the bridge by a cam follower motion of the door edge with the bridge cams and said door is kept electrically non-conductive by insulation of the bridge cam surfaces.

4 Claims, 4 Drawing Figures

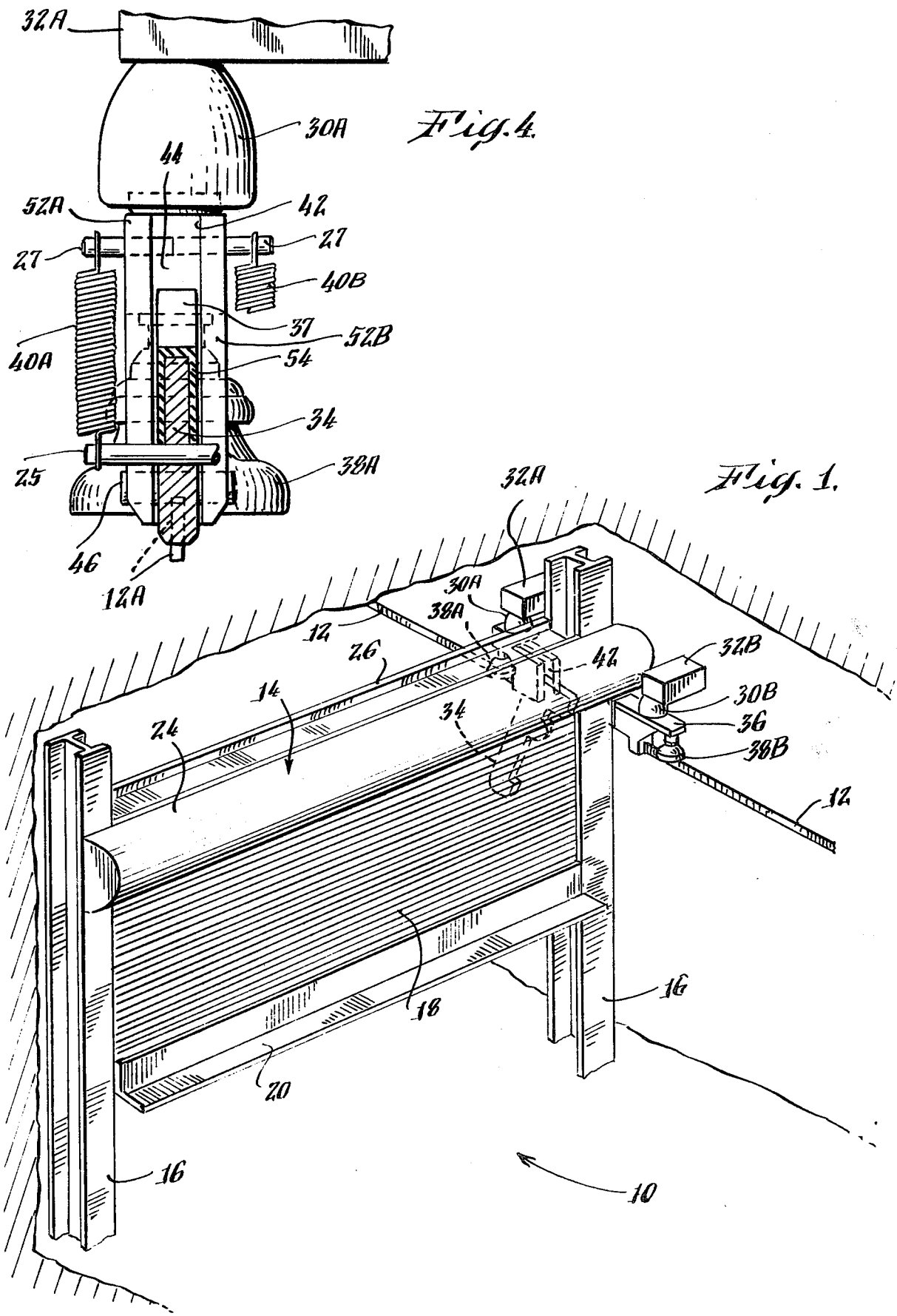

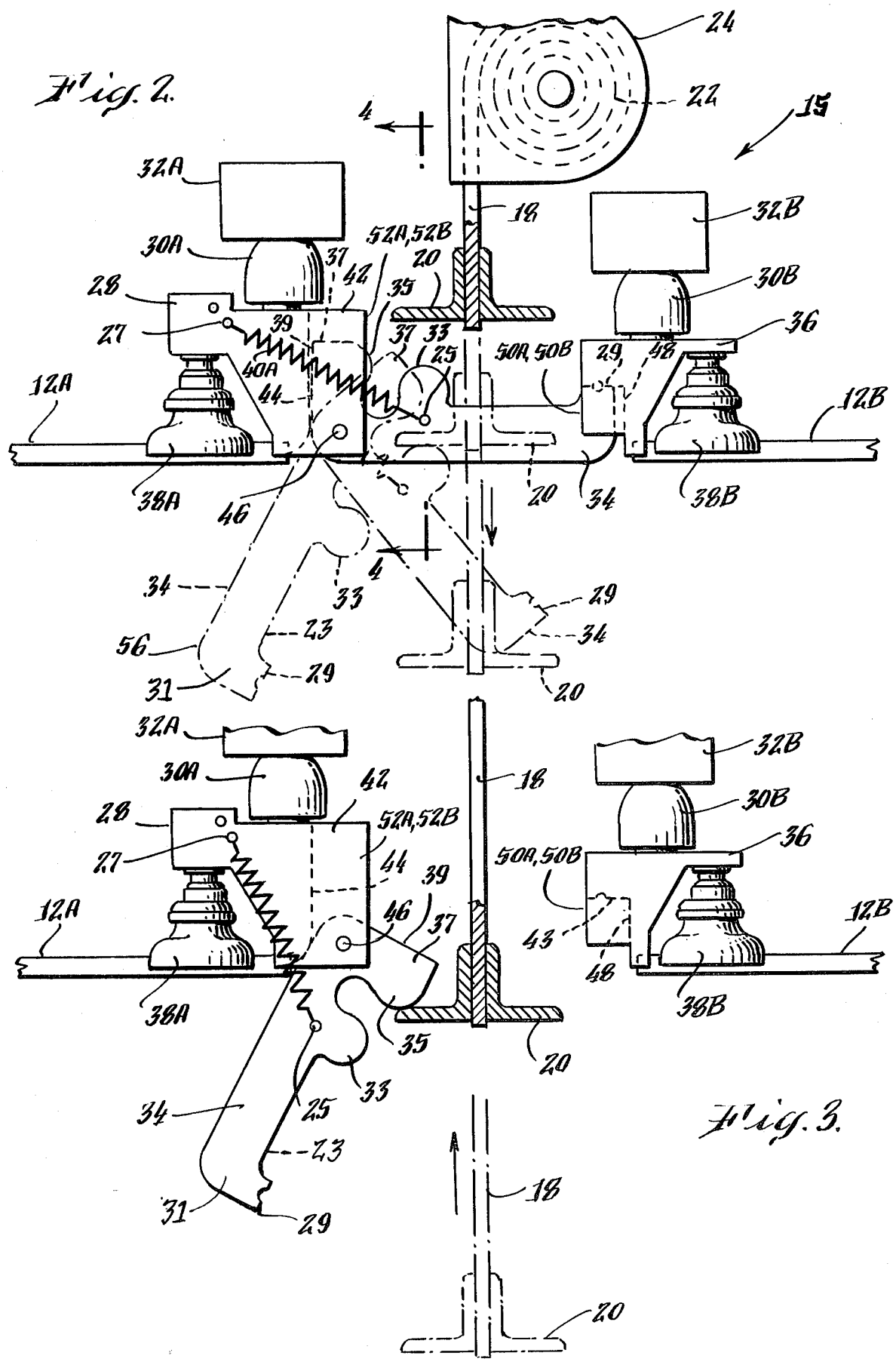

TROLLEY BRIDGE

BACKGROUND OF THE INVENTION

This invention relates to a trolley conductor bridging means in an electrically powered trolley vehicle transportation system where said trolleys run by contact with a solid conductor. More particularly, this invention relates to such bridging means that when closed provides continuous electrical power and mechanically indistinguishable connection across a door clearance opening between said conductors and where said bridging means is opened and closed automatically by the passage of a door transverse to said conductor with said door remaining electrically non-conductive.

In the operation of electrically powered trolley systems where the trolleys run by contact with a solid conductor, any necessary interruptions in said conductors to allow for the closing or opening of gates, doors or crossing arms etc. has always presented problems. For example, it has always been a problem as to how to provide power throughout the system while also providing openings between the conductors through which the aforementioned devices could cross. It has also been a problem as to how to keep the crossing devices electrically inactive while crossing the electrically active trolley conductor. It has further been a problem as to how to provide no encumbrances to smooth passage along the trolley conductor when said interruptions between the conductors have been bridged.

In addition, so as to not to require the presence of a separate operator for such bridging means, it has also been necessary that such bridging means be opened and closed automatically. Further, since the location of such bridging means can at times be very inconvenient and difficult to access, it has also been demanded that such bridging means be mechanically simple in design and require little or no maintenance and/or repair.

A number of different types of trolley conductor bridging means are known in the art. Such means in one field of application have been used to provide mechanical bridging of a trolley guide rail where the path of the trolley was directed by travel along the guide rail and where a break in that mechanical guide rail was demanded to allow passage of an overhead steel curtain. The U.S. Pat. No. 779,554 to R. T. McCarroll discusses such a means. McCarroll provides a lever controlled mechanical bridging apparatus for the automatic opening and closing of the non-conductive guide rail bridge link to allow passage of a steel curtain. As an integral art of this bridging apparatus, McCarroll uses the container mechanism of the steel curtain to support the guide rail with the position of the container being critical to the alignment of the steel curtain with the bridge actuating lever.

This bridging system, though, is designed for use in a mechanical application only and in that application for use with the integral steel curtain and its container. Such bridging system, by design, would be ill-suited for an electrical conductor system.

For instance, in electrical conductor systems it is well known that a major concern in the design of such a system is the electrical insulation and isolation of the electrically active conductor from its surroundings. From the above disclosure it is evident that such insulation and isolation are not present. For one, the steel curtain due to its integral attachment to the rail conductor would be electrically conductive at all times. Such a conductor system is therefore impossible to use, since anyone touching the door would be electrocuted and since anything in subsequent contact with the steel curtain would also become electrically active. Further, such apparatus would be unsuitable for use in a mine tunnel for the like, since the lever actuator design of the bridge provides unneeded additional mechanical complexity with its associated additional repair and replacement problems.

Automatically door actuated electrical conductor bridging mechanisms were heretofore unknown in the art. While a variety of electrical conductor bridging means are known in the art, none disclose the door actuated bridging means of this invention. Examples of electrical conductor bridging means are U.S. Pat. No. 450,687 to E. Thomson, and U.S. Pat. No. 1,010,096 to T. Varney.

The Thomson patent discloses a motor operated gate-like conductor bridge for openings in an overhead conductor line. This invention is extremely complex requiring timing, coordination and actuation of several electrical components with the trolley vehicle to effect said bridge.

The Varney Patent discloses a lateral lever bridge which maintains the alignment of the trolley rails, where because of their separation, such conductors have become misaligned. In addition to the lateral bridge, the Varney patent requires a separate knife switch to provide electrical power across said separation. This invention is inoperable with an overhead door because of the interference of both said knife switch and said lateral bridge with the travel of said door and is further ill suited for use in a mine or the like by requiring manual actuation.

OBJECTS OF THE INVENTION

It is therefore an object of this invention to provide a bridging means as to an interruption in a solid trolley conductor for a door clearance opening where said trolleys run by contact with said solid conductor.

It is a further object of this invention to provide continuous electrical power and mechanical indistinguishable connection across said interruption when the bridge is in its closed or horizontal position.

It is still a further object of this invention that said bridging means be opened and closed automatically by the downward or upward force of a transverse moving door while said door is kept electrically non-conductive by insulation of the bridge contact surfaces.

SUMMARY OF THE INVENTION

Briefly a bridging means made in accordance with this invention includes a trolley bridge anchor block, a trolley bridge seating block, a bridge lever and two springs.

The trolley bridge anchor block is affixed to one conductor end and is arranged with a pivot socket and an arresting surface. The trolley bridge seating block is affixed to the second conductor end and is arranged with a downwardly opening socket to disengageably receive the engageable end of the bridge lever when the lever is in a horizontal position.

The bridge lever, has one engageable end and a second end with a pivot portion socketly and pivotly held in the pivot socket of said anchor block. The second end of said bridge lever also includes an arresting surface arranged to engage and prevent said bridge from rising upward past the horizontal position. The bridge lever is constructed of a single solid piece of conductive material and arranged with two cam surfaces, one cam solely causing said bridge to open and the other cam solely causing said bridge to close. The cam surfaces are covered with a non-conductive material to thereby electrically insulate said door edge when contacting said bridge. In addition, affixed to the bridge lever and anchor block are two springs whose line of action is arranged so as to urge the bridge lever opened and closed.

In operation when the door is closed, the bridging means is initially automatically caused to open by the downward cam follower action of the door edge. As the door continues closing, the bridge lever is forced further opened by said cam follower action until the line of action of said springs is pushed passed the lever pivot point whereby the springs action then urges the bridge completely open so that the bridge is now vertically parked out of the path of the door. Conversely said bridge is closed by the reverse sequence of operations as indicated by the opening of the mine door.

BRIEF DESCRIPTION OF THE DRAWINGS

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which we have illustrated and described the preferred form of the invention.

Of the drawings;

FIG. 1 is a perspective view showing the invention as applied to a mine shaft.

FIG. 2 is a vertical section illustrating the invention in various stages of its operation as the trolley bridge opens.

FIG. 3 is another vertical section like FIG. 2 illustrating the operation of the invention as the trolley bridge is about to be closed.

FIG. 4 is a transverse section along the lines 4 of FIG. 2.

DESCRIPTION OF THE PREFERRED EMBODIMENT

While the invention may be adopted for use in various industrial structures in which a trolley conductor has to be interrupted, it is being illustrated herein as applied to a mine shaft.

In FIG. 1 there is shown a horizontal mine shaft 10 through which trolley tracks (not shown) have been placed to run along the floor thereof and upon which a trolley vehicle having an electric motor normally would be operated. The electricity for said trolley vehicle is derived from contact with the overhead trolley conductor 12. Erected across said mine shaft 10 there is a door structure 14 having vertical travel along support 16, by which the entry door 18 travels up and down. The main portion of said door 18 is vertically flexible permitting it to be stored in a entry door roll 22, which is housed within the container 24 that is supported from the horizontal structural steel 26 and attached to the bottom of the said entry door 18 is a door foot 20.

In this particular illustration the trolley conductor is in two terminal ends 12A and 12B (shown in detail in FIG. 2), with the bridge means 15 located between the opening of the terminal ends. Terminal end 12B has one end attached to a seating block 36 and the other terminal end 12A is attached to a anchor block 28. Within a socket and pivotly mounted to the anchor block 28 is a bridge 34 so that when said bridge 34 is horizontal and mated to said seating block 36 there is electrical conduction between the two terminal ends 12A and 12B of the trolley conductor 12. Further, when said bridge 34 is in a down position as pictured in FIG. 1 there is a space between said terminal ends 12A and 12B such that the vertical door 18 may pass down and seal off one portion of the horizontal mine shaft 10.

In the conductor configuration of FIG. 1 the solid trolley conductor 12 is normally only supported by insulated supports like 30A or 30B where these supports are in turn determinately attached to a trolley support members like 32A or 32B, which are a part of the structure of the mine shaft framework. With the bridging means for the interrupted conductor of this invention, the conductor terminal end 12B is now additionally supported with trolley clamp 38B with the terminal end 12B going into the seating block 36 to be rigidly positioned. Similarly, the other terminal end 12A is supported with trolley clamp 38A with the terminal end 12A going into the anchor block 28. In addition there is the normal insulator supports 30A and 30B to the framework supporting members 32A and 32B which now secures the anchor and seating blocks thereto.

For more details of the description of the invention of the trolley bridge means, please refer to FIGS. 2, 3 and 4 wherein the solid line portions show the bridge in a horizontal position and the dotted illustration show the operation of the bridge as it is moved from its closed horizontal position to its opened vertical position.

From FIGS. 2 and 3 it can be seen that on conductor terminal end 12A, the anchor block 28 has a pivot socket 42, which is formed by a hollow between two vertically extending portions 52A and 52B of said block wherein the back end of the hollow has a vertical arresting surface 44 and wherein there is a pivot pin 46 which passes through the anchor block 28 and through a pivot hole in the bridge 34. On the other conductor terminal end 12B there is a seating block 36 which has a hollow portion arranged as a socket 48 between two vertically extending walls 50A and 50B to engage and receive a receivable end of the bridge 34 when it is in the horizontal position. Both the pivot socket 42 of the anchor block 28 and the pivot socket 48 of the seating block 36 are arranged so that there is a relatively large amount of metal overlapping the metal of the bridge so as to be sure of a good electrical contact for carrying the electricity from terminal end 12A to the terminal end 12B when in operation.

In order to fully understand and appreciate the workings of the bridge means, the details of the bridge 34 are of particular importance. From FIGS. 2 and 3 it can be seen that at one extreme end of the bridge is a pivot portion 37 located within the socket 42 of the anchor block 28 where said bridge end has an arresting surface 39 integral of the pivot portion 37 of the bridge 34 and which bridge arresting surface 39 is constructed and arranged so as to engage an arresting surface 44 of the anchor block 28 in a closed arrangement. The other extreme end 31 of the bridge is an engageable end with a horizontal surface 29 which engages a similar horizontal surface 43 of the seating block 36 so that the bridge 34 is rigidly located to withstand the upward pressure from contact with the passing trolley.

A further important part of the pivotal bridge are the springs 40A and 40B. These springs 40A and 40B are attached at one end to the anchor block 28 at a position 27 well above the horizontal position 46 of the pivot pin and are attached on the other end to a central position 25 of the trolley bridge 34. The line of action of said springs 40A and 40B when the bridge is in the closed position is, therefore, well above the position of the pivot and thereby the bridge is urged by the springs 40A and 40B in an upward closed position.

The upper surface 23 of the pivotal bridge 34 is arranged with two cams 33 and 35, one being a centrally located rounded opening cam 33, and the other being a semi-round closing cam 35 located at the pivotal end 37. As illustrated in FIGS. 2 and 3 the door foot 20 is arranged with a horizontal surface so that when the door 18 is moving downward it will contact and slide on the opening cam 33 to then open bridge 34, and it is assisted by the operation of the spring means 40A and 40B. It is important to note that the line of action of the springs 40A and 40B is such that when the door foot 20 is moving the opening cam surface 33 downward that when the springs line of action passes the center point of the pivot 46 that the springs 40A and 40B will then urge the bridge into a vertical open position 56. Conversely when the door 18 is moving upward the edge of the door foot 20 contacts the closing cam surface 35 to overcome the opening force until the line of action of the springs 40A and 40B passes the center point of the pivot 46, at which time the springs will snap the bridge closed such that the pivot socket arresting surface 44 of the anchor block 28 and the stop surface 39 of the bridge 34 engage each other and hold the bridge in a firmly horizontal position against any upward pressure that may be exerted upon it by contact with the passing trolley.

So as to prevent the electrical contact of the door foot 20 with the bridge's opening and closing cam surfaces, it can be seen with respect to FIG. 4, that the cam of the bridge 34 is preferably constructed with a non-conductive insulator 54 over the metal conductor of the bridge 34.

For a better understanding of the bridge means, its operation will be described in a typical mine shaft 10 configuration as illustrated in FIG. 1, and where the actual movement of the bridge 34 can be seen from FIGS. 2 and 3. The trolley bridge 34 is held in its closed horizontal position by the springs 40A and 40B such that said bridge 34 provides electrical conduction and mechanically indistinguishable connection across the door clearance interruption between the conductor ends 12A and 12B. Electrical contact and mechanical positioning of said bridge 34 is the result of the mating of the contact end 29 of said bridge 34 with the arresting surface 43 of the seating block socket 48 and the mating of pivotal arresting surface 39 of said bridge 34 with its companion anchor block pivot socket arresting surface 44. With the bridge 34 in such horizontal position, when the demand occurs, the mine door 18 can be closed and thereby automatically opening said bridge 34 by the following sequence of actions.

As the door 18 is moved downward or closed, the door foot 20 contacts the uppermost surface of the opening cam 33 of the bridge 34. Further closing of the door 18 causes the door foot 20 to open the bridge 34 by the swinging of said bridge 34 on the anchor block pivot 46 and thereby breaking contact with the engageable mating socket 48 of the seating block 36. Continued downward movement of the door 18 further causes the door foot 20 to open said bridge 34 by the pushing along of said door foot 20 on the opening cam surface 33 against the force of the springs until the line of action of the springs 40A and 40B passes over the bridge anchor block pivot point 46, at which time the bridge snaps open to its vertical position 56. The mine door 18 is now free to be fully closed with no interferences.

In the door opening situation, with the mine door 18 closed, the door 18 moves upward unencumbered until the door foot 20 just makes contact with the closing cam 35 of the bridge 34. Further upward motion of the door 18 now causes the door foot 20 to push along the closing cam surface against the force of the springs 40A and 40B, thereby causing the bridge 34 to swing on its pivot 46 toward the seating block 36. Again, when the line of action of the springs 40A and 40B moves passed the center of said pivot 46 the bridge 34 will snap closed, and the bridge's engageable end 31 will be held in the socket 48 of the seating block 36.

The springs 40A and 40B now hold the bridge 34 in this closed horizontal position and the closing cam is socketed unobstructively for when it is demanded to close the mine door 18 again.

Although this particular embodiment has been shown in a specific setting, the features of the setting should in no way be considered the sole or limiting embodiment.

For example, in this embodiment the briding apparatus has been shown to be connected onto an overhead trolley conductor. The invention though would work equally well as being located in a variety of positions, i.e. along the floor or walls.

The invenion has also been shown to be embodied solely with an overhead door apparatus though the bridging means would work equally as well with a variety of actuating members, including gates, barrier levers etc.

While in accordance with the provisions of the statutes, there is illustrated and described herein the best form of the invention now known to us. Those skilled in the art may understand that changes may be made in the form of the apparatus disclosed without departure from the spirit of the invention covered by the claims, and that certain features of the invention may sometimes be used to advantage without corresponding use of other features.

What is claimed is:

1. In an electrically powered trolley system for a mine and the like wherein said trolleys run by contact with a solid conductor and wherein the trolley conductor is interrupted from time to time by a door passing through said interruption to seal off an open portion of said mine and the trolley conductor terminals are horizontally spaced from each other to provide a clearance for said door, the invention of a bridge means comprising:

a bridge anchor block affixed to one of said conductors and arranged with a pivot socket and an arresting surface;

a bridge having one engageable end and a second end with a pivot portion socketly and pivotly held in the pivot socket of said anchor block and having an arresting stop surface arranged to engage said arresting surface of said anchor block to prevent said bridge from rising upward past the horizontal portion thereof;

a seating block on said other trolley conductor having a downwardly opening socket to disengageably receive said engageable end of said bridge where said bridge is in the horizontal position; and a spring means having one end fixed to said block and the other end fixed to said bridge, the line of action of said springs arranged to urge the bridge into socket relationship with said seating block, wherein said bridge is constructed and arranged with cam surfaces thereon which upon door closing by contact with said door causes said bridge to disengage from said seating block to swing same on said pivot to an open position and which upon door opening causes said bridge to swing to the closed engaged position with said seating block.

2. A bridge means according to claim 1 wherein said bridge is constructed of a single solid piece of conductive material and wherein the cam surfaces are covered with a non-conductive material to electrically insulate said door when contacting said bridge.

3. A bridge according to claims 1 or 2 wherein said cam surfaces are two, one solely causing said bridge to open and the other for causing said bridge to close.

4. A bridge means according to claim 1 wherein the spring means is attached to the anchor block and the bridge so that the line of action of said spring, as said bridge is swung into and out of engagement with said seating block, passes from one side to the other side of said pivot whereby said bridge is urged open when said line of spring action passes said pivot as the bridge is caused open and wherein said bridge is urged closed when said line of spring action passes said pivot as the bridge is caused closed.

* * * * *